US00RE45994E

(19) United States
(12) Reissued Patent
Saito et al.

(10) Patent Number: US RE45,994 E
(45) Date of Reissued Patent: May 3, 2016

(54) ELECTROLYTIC CAPACITOR AND ITS MANUFACTURING METHOD

(71) Applicant: PANASONIC CORPORATION, Osaka (JP)

(72) Inventors: Kazuyo Saito, Osaka (JP); Yukihiro Nitta, Kyoto (JP); Hiroshi Tada, Osaka (JP); Shigeyoshi Iwamoto, Kyoto (JP)

(73) Assignee: PANASONIC CORPORATION, Osaka (JP)

(21) Appl. No.: 14/515,462

(22) Filed: Oct. 15, 2014

Related U.S. Patent Documents

Reissue of:
(64) Patent No.: 6,307,735
Issued: Oct. 23, 2001
Appl. No.: 09/233,936
Filed: Jan. 20, 1999

(30) Foreign Application Priority Data

Jan. 28, 1998 (JP) ..... 10-015269
Dec. 9, 1998 (JP) ..... 10-350072

(51) Int. Cl.
*H01G 9/02* (2006.01)
*H01G 9/025* (2006.01)
*H01G 9/028* (2006.01)

(52) U.S. Cl.
CPC ..... *H01G 9/025* (2013.01); *H01G 9/028* (2013.01)

(58) Field of Classification Search
CPC ..... H01G 9/025; H01G 9/028
USPC ..... 361/517, 512, 523
See application file for complete search history.

(56) References Cited

U.S. PATENT DOCUMENTS

| | | | | |
|---|---|---|---|---|
| 3,646,404 | A | 2/1972 | Matsuo et al. | |
| RE28,015 | E * | 5/1974 | Vermilyea et al. | 361/511 |
| 4,715,976 | A | 12/1987 | Mori et al. | |
| 4,864,472 | A | 9/1989 | Yoshimura et al. | |
| 5,189,770 | A | 3/1993 | Waidhas et al. | |
| 5,550,706 | A * | 8/1996 | Kurzweil et al. | 361/502 |
| 5,754,394 | A * | 5/1998 | Evans et al. | 361/516 |
| 5,870,275 | A * | 2/1999 | Shiono et al. | 361/504 |
| 5,930,108 | A * | 7/1999 | Kurzweil et al. | 361/502 |
| 5,972,052 | A | 10/1999 | Kobayashi et al. | |
| 6,052,273 | A | 4/2000 | Inoue et al. | |
| 6,413,282 | B1 | 7/2002 | Tanahashi et al. | |
| 6,473,293 | B2 | 10/2002 | Shimada et al. | |

FOREIGN PATENT DOCUMENTS

| | | |
|---|---|---|
| CN | 1117323 A | 2/1996 |
| EP | 0 274 755 B1 | 7/1988 |
| EP | 0 342 998 B1 | 11/1989 |

(Continued)

*Primary Examiner* — Linh Nguyen
(74) *Attorney, Agent, or Firm* — McDermott Will & Emery LLP

(57) ABSTRACT

An electrolytic capacitor includes a capacitor element having a positive electrode, a negative electrode, and a solid organic conductive material disposed between the positive and the negative electrode, an electrolyte, a case for accommodating the capacitor element and the electrolyte, and a sealing member disposed to cover the opening of the case. The solid organic conductive material has at least one material selected from organic semiconductor and conductive polymer. The electrolytic capacitor having excellent impedance characteristic, small current leak, excellent reliability, and high dielectric strength.

39 Claims, 2 Drawing Sheets

(56) References Cited

FOREIGN PATENT DOCUMENTS

| | | | |
|---|---|---|---|
| EP | 0 358 239 | B1 | 3/1990 |
| EP | 0 684 620 | A1 | 11/1995 |
| EP | 0 833 352 | A1 | 4/1998 |
| EP | 0 716 424 | B1 | 8/1999 |
| JP | 61-281513 | A | 12/1986 |
| JP | 01-114029 | A | 5/1989 |
| JP | 1-90517 | | 7/1989 |
| JP | 02-248026 | A | 10/1990 |
| JP | 05-013286 | A | 1/1993 |
| JP | 05-144677 | A | 6/1993 |
| JP | 06-005471 | A | 1/1994 |
| JP | 07-283086 | A | 10/1995 |
| JP | 07-335495 | A | 12/1995 |
| JP | 08-321442 | A | 12/1996 |

* cited by examiner

ELECTROLYTIC CAPACITOR AND ITS MANUFACTURING METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*RELATED APPLICATIONS*

*This application is a reissue application of U.S. Pat. No. 6,307,735 issued on Oct. 23, 2001 issued from U.S. patent application Ser. No. 09/233,936, filed on Jan. 20, 1999, which claims the benefit of Japanese Patent Application No. 10-015269, filed on Jan. 28, 1998, and Japanese Patent Application No. 10-350072 filed on Dec. 9, 1998.*

FIELD OF THE INVENTION

The present invention relates to an electrolytic capacitor as an electronic component, and its manufacturing method.

BACKGROUND OF THE INVENTION

In the recent trend of electronic appliances becoming digital and higher in frequency, the electrolytic capacitor, one of the electronic components, is required to be larger in capacity than in the conventional part and is superior in impedance characteristic in high frequency region. To meet such demand, it has been attempted to enhance the conductivity of the driving electrolyte (hereinafter called electrolyte), decrease the resistance of separator, or use a conductive compound obtained by making conductive a sheet insulator such as paper, cloth, nonwoven cloth or high polymer film, as a separator.

Also as an attempt to make the separator conductive, various methods have been proposed, such as kneading or mixing of carbon fibers or particles, and compounding with graphite powder. Moreover, by using monomer such as pyrrole, thiophen or aniline, a method of forming a conductive high polymer on the surface by chemical oxidation and polymerization is disclosed (see Japanese Laid-open Patent No. 64-90517).

In the conventional constitution, however, there was a limit in enhancement of conductivity of electrolyte, and its conductivity is at most about ten to scores of mS/cm at the present, and electrolyte having a sufficient conductivity is not developed yet, and an electrolytic capacitor of an electrolyte having a sufficient impedance characteristic is not obtained so far.

On the other hand, for decrease of resistance of separator, it has been attempted to decrease the separator thickness, lower the density, make uniform the pore size, or change from paper to high polymer nonwoven fabric, but due to lack of strength by lowering of density and other problems, a sufficient effect of lowering the resistance is not obtained yet.

Further, the separator made conductive by kneading or mixing carbon fibers or particles is not sufficient in the electric conductivity, and it was hard to obtain a separator of low density. When using a separator by compounding graphite powder, there was a problem of increase of shorting due to drop of graphite powder and dispersion into electrolyte.

On the other hand, in the method of forming a conductive high polymer on the surface by chemical oxidation and polymerization from monomer of pyrrole, thiophen or aniline, it is difficult to compose an electrolytic capacitor of which rated voltage exceeds 35 V because there is almost no effect of deterioration of dielectric oxide film by oxidizing agent or chemical formation of conductive high polymer (defect repairing capability of dielectric oxide film). If composed, however, increase of leak current or shorting between anode and cathode may occur during agent process or high temperature test.

It is hence an object of the invention to present an electrolytic capacitor of high dielectric strength excellent in impedance characteristic, leak current property and reliability.

SUMMARY OF THE INVENTION

An electrolytic capacitor of the invention comprises:

(a) a capacitor element having an anode, a cathode, and a solid organic conductive material disposed between the anode and the cathode, (b) an electrolyte, (c) a case for accommodating the capacitor element and the electrolyte, and (d) a sealing member disposed to cover the opening of the case.

A manufacturing method of electrolytic capacitor of the invention comprises:

(a) a step of fabricating an anode, (b) a step of fabricating a cathode, (c) a step of forming a solid organic conductive material on the surface of the anode, and (d) a step of disposing an electrode between the anode having the solid organic conductive material and the cathode.

In this constitution, an electrolytic capacitor having an excellent impedance characteristic, an excellent leak current characteristic, an excellent reliability, and a high dielectric strength is obtained.

DETAILED DESCRIPTION OF THE INVENTION

Figure 1:
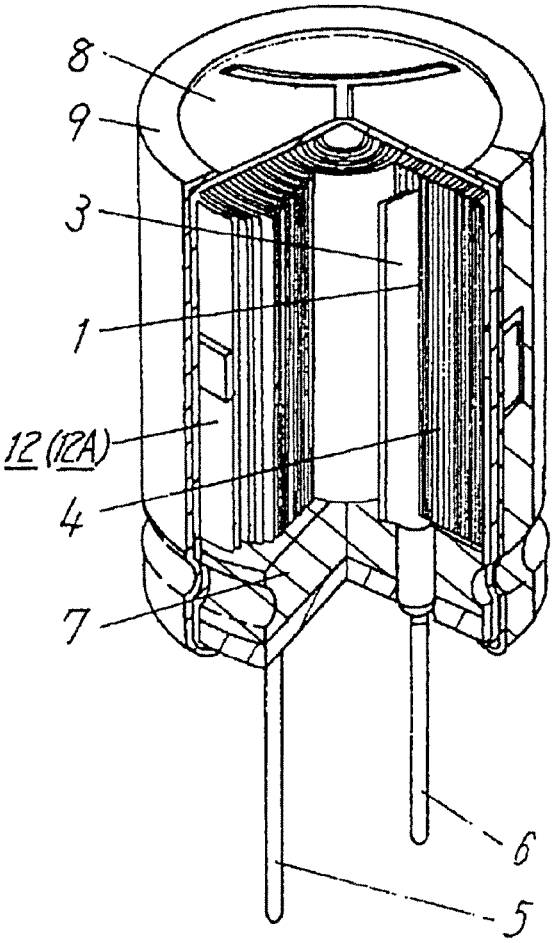
FIG. 1(a) is a partial sectional perspective view showing a constitution of an electrolytic capacitor according to a first embodiment of the invention.
FIG. 1(b) is a schematic diagram magnifying the essential parts of the electrolytic capacitor element shown in FIG. 1(a).
Figure 1:
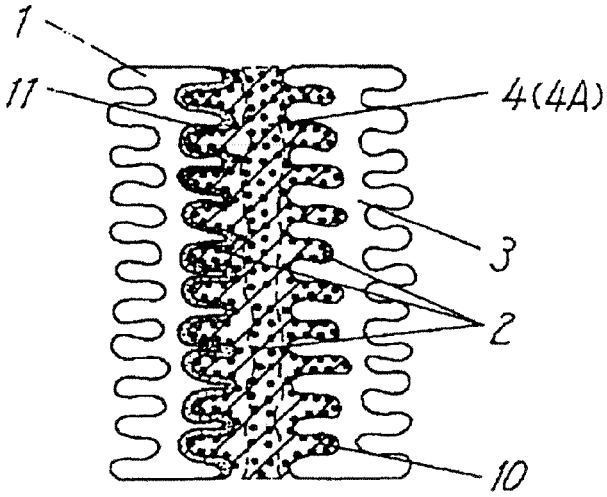

An electrolytic capacitor of the invention comprises a case having an opening, an electrolyte contained in the case, a capacitor element placed in the electrolyte, and a sealing member disposed to cover the opening. The capacitor element has an anode, a cathode, and a solid organic conductive material installed between the anode and cathode.

In this constitution, by making use of the high electric conductivity of the solid organic conductive material, the interpolar resistance in the conductive portion can be extremely decreased, and hence the impedance characteristic is enhanced. Further, by using together with the electrolyte having the repair capability of dielectric oxide film of valve action metal, an electrolytic capacitor of low leak current having a high dielectric strength is obtained.

In the invention, as the solid organic conductive material, an organic semiconductor is preferred, and preferred examples of organic semiconductor include 7,7,8,8-tetracyanoquinodimethane complex and its derivatives (hereinafter called TCNQ complexes). In this constitution, by dissolving and impregnating TCNQ complexes, a layer of solid organic conductive material having a high conductivity may be filled sufficiently to the inside of the pit of the anode processed by etching. As a result, an electrolytic capacitor excellent in impedance characteristic particularly in a high frequency region over 100 kHz can be obtained. Still more, TCNQ complexes can be directly applied on a separator base material. Moreover, a capacitor element winding an anode foil and a cathode foil through a separator base material can be manufactured. Alternatively, a capacitor element laminating one set or two sets or more of anode and cathode through separator base material may be impregnated in a heated and dissolved TCNQ complex solution, and by cooling and solidifying, the conductivity may be easily expressed. As a result, an electrolytic capacitor having an excellent impedance characteristic may be easily obtained.

In the invention, the word of "anode" means "positive electrode", and the word of "cathode" means "negative electrode". The word of "conductive high polymer" means "conductive polymer".

In the invention, the conductive high polymer includes pyrrole, aniline, thiophen, ethylene dioxythiophen, sulfonated aniline, sulfonated pyrrole, sulfonated thiophen, sulfonated ethylene dioxythiophen, their derivatives, and polymers of various polymerizable monomers.

Methods of forming such polymers include a method by liquid-phase chemical polymerization, a method by vapor-phase chemical polymerization, a method by liquid-phase electrolytic polymerization, and a method by drying soluble high polymer solution and utilizing residual high polymer.

Usable examples of conductive high polymer include polypyrrole, polyethylene dioxythiophen, or polyaniline formed by chemical polymerization or electrolytic polymerization, and dry residual sulfonated polyaniline obtained by drying solutions of soluble polyanilines.

In liquid-phase polymerization, in a solution containing at least the polymerizable monomer and a proper oxidizing agent, a capacitor element is immersed, and polymerized. In the case of an electrolytic polymerization, in a solution containing at least the polymerizable monomer and a proper oxidizing agent, a capacitor element is immersed, and power is supplied to polymerize it. In the case of vapor-phase polymerization, in a solution containing at least a proper oxidizing agent, a capacitor element is immersed (or immersed, lifted and dried), and then in the vapor phase containing at least the polymerizable monomer, the capacitor element is placed. By these methods, a layer of solid organic conductive material having a high conductivity can be sufficiently applied into the inside of pits of the anode processed by etching. As a result, an electrolytic capacitor having an excellent impedance characteristic also in a high frequency region of over 100 kHz in particular is obtained. Moreover, by polymerizing the conductive high polymer directly in the separator base material, anode or cathode in vapor phase, the conductivity can be easily expressed. As a result, an electrolytic capacitor having an excellent impedance characteristic may be easily obtained.

Further, since these conductive high polymers have a high compatibility in an electrolyte composed of an organic matter, when impregnated with the electrolyte, it is quickly swollen and diffused into the inner parts of the conductive high polymer. Accordingly, when composing a capacitor element having the dielectric oxide film coated with conductive high polymer, the capacity for restoring the dielectric oxide film can be maintained at high level.

The electrolyte comprises an electrolytic substance such as salt of organic acid or salt of inorganic acid, and a solvent for dissolving such electrolytic substances. As such organic solvent, an organic solvent capable of swelling an organic conductive material by immersing it is preferred. In this constitution, as mentioned above, the electrolyte quickly swells and diffuses into the inner part of the conductive high polymer. Therefore, when composing a capacitor element having the dielectric oxide film coated with conductive high polymer, the capacity for restoring the dielectric oxide film can be maintained at high level.

As the electrolytic substance to be dissolved in the electrolyte, in a base for composing the electrolyte, when the concentration of the base or hydroxide of base is 1 wt. % and the measuring temperature is 30° C., the hydrogen ion concentration in aqueous solution of base or hydroxide of base is usable at $1.0\times10^{-13}$ mol/dm$^3$ or more. As its specific example, as the base for composing the electrolytic substance, at least one is used as being selected from the group consisting of compound having alkyl substituent amidine group, quaternary salt of compound having alkyl substituent amidine group, tertiary amine and ammonium. In this constitution, leak of electrolyte is prevented, and a capacitor of enhanced reliability is obtained.

When composing a capacitor by using an electrolyte composed of an electrolytic substance of a base of a strong basicity of which hydrogen ion concentration is less than $1.0\times10^{-13}$ mol/dm$^3$ (for example, tetra-alkyl ammonium or tetra-alkyl phosphonium), in long-term environmental test in the compound environments of high temperature and high humidity (for example, 60° C. and 95% RH), the sealing member is likely to be damaged by the effects of the base of strong basicity, and leak is likely to occur, and the reliability is slightly inferior.

As the base for composing the electrolytic substance, at least one is preferred to be used as being selected from the group consisting of compound having alkyl substituent amidine group, quaternary salt of compound having alkyl substituent amidine group, tertiary amine and ammonium. In these electrolytic substances, when the concentration of the base or hydroxide of base is 1 wt. % and the measuring temperature is 30° C., the hydrogen ion concentration in aqueous solution of base or hydroxide of base is $1.0\times10^{-13}$ mol/dm$^3$ or more. Accordingly, the leak due to such strong acidity as mentioned above is less likely to occur.

As the quaternary salt of compound having alkyl substituent amidine group, a quaternary compound formed by alkyl group or aryl alkyl group with 1 to 11 carbon atoms is preferred, and such compound is one selected from the group consisting of imidazole compound, benzoimidazole compound, and alicyclic amidine compound. In this constitution, when hydroxide ions are formed by electrolytic reaction in the electrolyte, since the reaction between hydroxide ion and amidine group of N-C-N or reaction of decomposition and ring opening is fast, the electrolytic products disappear quickly. As a result, even in the condition of high temperature and high humidity, leak of electrolyte to outside can be prevented.

The quaternary salt of compound having alkyl substituent amidine group is at least one selected from the group consisting of 1-methyl-1,8-diazabicyclo [5,4,0] undecene-7, 1-methyl-1,5-diazabicyclo [4;3,0] nonenc-5, 1,2,3-trimethyl imidazolinium, 1,2,3,4-tetramethyl imidazolinium, 1,2-dimethyl-3-ethyl-imidazolinium, 1,3,4-trimethyl-2-ethyl imidazolinium, 1,3-dimethyl-2-heptyl imidazolinium, 1,3-dimethyl-2-(-3' heptyl) imidazolinium, 1,3-dimethyl-2-dodecyl imidazolinium, 1,2,3-trimethyl-1,4,5,6-tetrahydropyrimidium, 1,3-dimethyl imidazolium, 1-methyl-3-ethyl-imidazolium, and 1,3-dimethyl benzoimidazolium. According to this constitution, the conductivity of the electrolyte can be heightened and an excellent heat resistance is realized. Therefore, external leak of electrolyte at high temperature and high humidity is prevented, and an electrolytic capacitor having an excellent high temperature stability and low impedance is obtained.

The boiling point of the solvent of the electrolyte is 200° C. or more, the conductivity at measuring temperature of 30° C. of the electrolyte is 1.0 mS/cm or more, and the spark ignition voltage is 80 V or more. In this constitution, it is effective to prevent the problem of electrolytic capacitor for surface mounting, that is, deformation of appearance due to elevation of capacitor internal pressure caused by heat treatment during surface mounting (both capacitor and substrate exposed to high temperature of soldering). Moreover, since the boiling point of the solvent of the electrolyte is high (vapor pressure is low), defective soldering when mounting is less likely to occur, and further since the conductivity is high, the impedance performance is maintained. Still more, since the spark ignition voltage is sufficiently high, an electrolytic capacitor having a high dielectric strength is obtained.

The sealing member is composed by using an elastic rubber. In the solid electrolytic capacitor for surface mounting using this elastic rubber, the adsorbed moisture contained in the electrode foil of capacitor element, separator, solid electrolytic substance and rubber sealing member, or the adsorbed moisture bonded to the inside of the case is evaporated at once at high temperature at the time of surface mounting. As a result, the pressure elevation inside the capacitor is extreme, which may lead to defective air tightness of the capacitor or scattering of sealing member. However, by containing the electrolyte using a solvent of high boiling point (low vapor pressure), the total pressure inside the capacitor can be lowered at the time of mounting. Therefore, by containing the liquid component (herein an electrolytic solution) in addition to the electrolytic substance of solid electrolytic substance type, pressure elevation inside the capacitor can be suppressed, and defective soldering and others can be improved.

Examples of solvent of electrolyte having a boiling point of 200° C. or more include 3-alkyl-1,3-oxazolidine-2-one (more specifically, 3-methyl-1,3-oxazolidine-2-one: boiling point 260° C.), 1,3-dialkyl-2-imidazolidinone other than 1,3-dimethyl-2-imidazolidinone (more specifically, 1,3-dimethyl-2-imidazolidinone: boiling point 236° C., 1,3-dipropyl-2-imidazolidinone: boiling point 255° C., 1-methyl-3-ethyl-2-imidazolidinone: boiling point 230° C.), 1,3,4-trialkyl-2-imidazol:idinone (more specifically, 1,3,4-trimethyl-2-imidazolidinone: boiling point 241° C.), 1,3,4,5-tetra-alkyl-2-imidazolidinone (more specifically, 1,3,4,5-tetramethyl-2-imidazolidinone: boiling point 249° C.), cyclic lactone (more specifically, γ-butyrolactone: boiling point 204° C.), polyhydric alcohol (more specifically, ethylene glycol: boiling point 201° C., glycerin: boiling point 290° C.), carbonate (more specifically, ethylene carbonate: boiling point 238° C., propylene carbonate: 242° C.), and others.

Hereinafter, preferred embodiments of the invention and prior arts as comparative examples are described below while referring to the attached drawings.

FIG. 1(a) and FIG. 1(b) are a partial sectional perspective view showing a constitution of an electrolytic capacitor of the invention, and a conceptual view magnifying essential parts of its element. In FIG. 1(b), the surface is roughened by etching process, and then a dielectric oxide film 11 is formed by oxidation treatment. An anode foil 1 composed of an aluminum foil forming a solid organic conductive material 2 on its surface, and a cathode foil 3 formed by etching an aluminum foil are wound around a separator 4. Or, after roughening the surface by etching process, an anode foil 1 composed of an aluminum foil forming a dielectric oxide film 11 by oxidation treatment and a cathode foil 3 formed by etching process of aluminum foil are wound through an electrolytic paper 4A. Then by high temperature treatment thereof, the electrolytic paper 4A is treated by any method of carbonization treatment, and a capacitor element 12 or 12A is formed. Between the dielectric oxide film 11 and cathode foil 3, a solid organic conductive material 2 is formed. It is impregnated with an electrolyte 10, and swollen and infiltrated into the solid organic conductive material 2. Thus, the capacitor element 12 or 12A is composed. The capacitor element 12 or 12A is put in a cylindrical aluminum metallic case 8 with a bottom as shown in FIG. 1(a). Further, the releasing end of the aluminum metallic case 8 is sealed so that a sealing member 7 made of rubber may penetrate through an anode lead 5 and a cathode lead 6 for external lead-out being led out from the anode foil 1 and cathode foil 3 from the sealing member 7. Thus, the side surface of the metallic case 8 is covered with an external tube 9.

Figure 2:
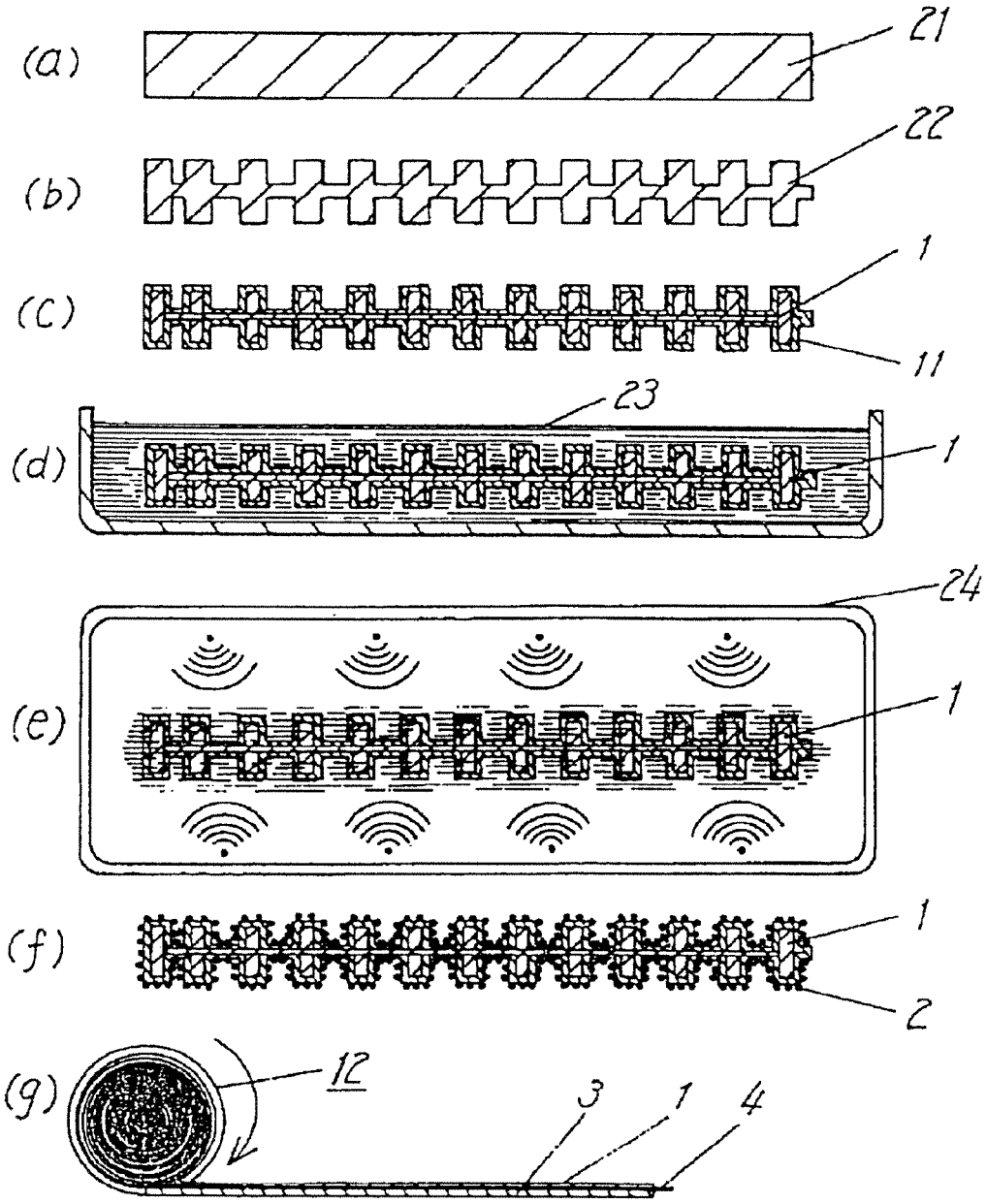
FIG. 2 is a manufacturing process diagram for manufacturing the anode foil of an electrolytic capacitor of the invention.

FIG. 2(a) to FIG. 2(g) show the manufacturing process for manufacturing the anode foil 1 for electrolytic capacitor of the invention in batch. As shown in FIG. 2 (a), an etching foil 22 (FIG. 2(b)) obtained by etching an aluminum foil 21 is oxidized. In this way, an anode foil 1 forming a dielectric oxide film 11 is formed (FIG. 2(c)). Successively, this anode foil 1 is impregnated in a solution 23 containing a polymerizable monomer capable of forming a conductive high polymer layer as shown in FIG. 2 (d), and lifted, then heated (also dried) by a heating oven 24 as shown in FIG. 2(e). Thus, as shown in FIG. 2(f), an anode foil 1 forming a solid organic conductive material 2 on the surface is composed. Next, as shown in FIG. 2(g), thus constituted anode foil 1 and the cathode foil 3 formed by etching the aluminum foil 21 are wound through a separator 4. In this way, a capacitor element 12 is composed. The subsequent process is same as in the above manufacturing method. The capacitor element 12 is put into a cylindrical metallic case 8 with a bottom together with electrolyte 10. The releasing end of the metallic case 8 is sealed, by using a sealing member 7, so that an anode lead 5 and a cathode lead 6 for external lead-out being led out from the anode foil 1 and cathode foil 3 respectively may penetrate through the sealing member 7. Thus, the side of the metallic case 8 is covered with an external tube 9.

The electrolyte used in the electrolytic capacitor of the invention is specifically described below.

As the solvent for the electrolyte of the electrolytic capacitor of the invention, an organic solvent stable electrically and chemically and capable of swelling in the organic conductive material is used. Such organic solvent is desired to have a boiling point of 200° C. or more. The solvent is preferred to be mainly composed of γ-butyrolactone and/or ethylene glycol. In addition, for the purpose of improving the low temperature characteristic and enhancing the dielectric strength, other organic solvent compatible with γ-butyrolactone and/or ethylene glycol may be mixed as a subsidiary solvent. Nevertheless, the subsidiary solvent is not required to be an organic solvent capable of swelling in an organic conductive material.

As the subsidiary solvent, in addition to the organic solvent with boiling point of 200° C. or more mentioned above, the following organic solvents may be used either alone or as a mixed solvent of two or more kinds, that is, polyhydric alcohol system solvents (propylene glycol, diethylene glycol, 1,4-butane diol, polyoxy alkylene polyol), lactone system solvents (γ-valerolactone, δ-valerolactone, 3-ethyl-1,3-oxyzolidine-2-one), water, amide system solvents (N-methyl formamide, N,N-dimethyl formamide, N-methyl acetamide), ether system solvents (methylal, 1,2-dimethoxy ethane, 1-ethoxy-2-methoxy ethane, 1,2-diethoxy ethane), nitrile system solvents (acetonitrile, 3-methoxy propionitrile), furane system solvents (2,5-dimethoxy tetrahydrofurane), 2-imidazolidinone system solvents (1,3-dimethyl-2-imidazolidinone), and others.

In the case of mixed solvent, the mixing ratio of the solvent is preferred to be 40 parts by weight of a solvent of which boiling point is less than 200° C. in 100 parts by weight of solvent of which boiling point is 200° C. or more. If the content of the solvent of which boiling point is less than 200° C. is more than 40 parts, the heat resistance is lowered when an electrolytic capacitor is formed for surface mounting, and the defective rate of soldering becomes higher.

Examples of tertiary amine used in the electrolyte of the invention include trialkylamines (trimethylamine, dimethylethylamine, methyldiethylamine, triethylamine, dimethyl n-propylamine, dimethyl isopropylamine, methyl ethyl n-propylamine, methylethyl isopropylamine, diethyl n-propylamine, diethyl isopropylamine, tri-n-propylamine, tri-isopropylamine, tri-n-butylamine, tri-tert-butylamine, etc.), and phenyl group containing amines (dimethyl phenylamine, methylethyl phenylamine, diethyl phenylamine, etc.).

Among them, trialkylamine having a high conductivity is preferred. More preferably, it is preferred to use at least one selected from the group consisting of trimethylamine, dimethylethylamine, methyl diethylamine, and triethylamine, and by the use thereof, a capacitor high in conductivity and having an excellent impedance performance is obtained.

Examples of compound having alkyl substituent amidine group used in the electrolyte of the invention include imidazole compound, benzoimidazole compound, and alicyclic amidine compound (pyrimidine compound, imidazoline compound). More specifically, it is preferred to use 1,8-diazabicyclo [5,4,0] undecene-7, 1,5-diazabicyclo [4,3,0] nonene-5, 1,2-dimethyl imidazolinium, 1,2,4-trimethyl imidazoline, 1-methyl-2-ethyl-imidazoline, 1,4-dimethyl-2-ethyl imidazoline, 1-methyl-2-heptyl imidazoline, 1-methyl-2-(3' heptyl) imidazoline, 1-methyl-2-dodecyl imidazoline, 1,2-dimethyl-1,4,5,6-tetrahydropyrimidine, 1-methyl imidazole, and 1-methyl benzoimidazole, and when these compounds are used, a capacitor having a high conductivity and excellent impedance performance is obtained.

In the examples of quaternary salt of compound having alkyl substituent amidine group used as the electrolyte is preferred to be a quaternary compound formed by alkyl group or aryl alkyl group with 1 to 11 carbon atoms is preferred, and preferred examples of amidine group are imidazole compound, benzoimidazole compound, and alicyclic amidine compounds (pyrimidine compound, imidazoline compound). Specific preferred examples include 1-methyl-1,8-diazabicyclo [5,4,0] undecene-7, 1-methyl-1,5-diazabicyclo [4,3,0] nonene-5, 1,2,3-trimethyl imidazolinium, 1,2,3,4-tetramethyl imidazolinium, 1,2-dimethyl-3-ethyl imidazolinium, 1,3,4-trimethyl-2-ethyl imidazolinium, 1,3-dimethyl-2-heptyl imidazolinium, 1,3-dimethyl-2-(-3' heptyl) imidazolinium, 1,3-dimethyl-2-dodecyl imidazolinium, 1,2,3-trimethyl-1,4,5,6-tetrahydropyrimidium, 1,3-dimethyl imidazolium, 1-methyl-3-ethyl-imidazolium, and 1,3-dimethyl benzoimidazolium. By using these compounds, it is possible to obtain an electrolytic capacitor with an excellent long-term stability having a high heat resistance, high conductivity, and excellent impedance performance.

Examples of organic acid used in the electrolyte of the invention include the following compounds: polycarboxylic acid (valence of 2 to 4), aliphatic polycarboxylic acid (saturated polycarboxylic acid, for example, oxalic acid, malonic acid, succinic acid, glutaric acid, adipic acid, pimelic acid, suberic acid, azelaic acid, sebatic acid, 1,6-decanoic dicarboxylic acid, 5,6-decanoic dicarboxylic acid, 1,7-octanoic dicarboxylic acid, and unsaturated polycarboxylic acid, for example, maleic acid, fumaric acid, itaconic acid, aromatic polycarboxylic acid (for example, phthalic acid, isophthalic acid, terephthalic acid, trimellitic acid, pyromellitic acid), alicyclic polycarboxylic acid (for example, cyclohexane-1,2-dicarboxylic acid, cyclohexene-1,2-dicarboxylic acid, etc.), hexahydrophthalic acid, alkyl substituents with 1 to 3 carbon atoms of their polycarboxylic acids (for example, citraconic acid, dimethyl maleic acid), or nitro substitutes (nitrophthalic acid, 3-nitrophthalic acid, 4-nitrophthalic acid), and polycarboxylic acid containing sulfur (for example, thiopropionic acid), monocarboxylic acid, aliphatic monocarboxylic acid with 1 to 30 carbon atoms (for example, formic acid, acetic acid, propionic acid, butyric acid, isobutyric acid, valeric acid, caproic acid, enanthic acid, caprylic acid, perargonic acid, lauric acid, mystyric acid, stearic acid, behenic acid, other saturated carboxylic acid, and acrylic acid, methacrylic acid, oleic acid, and other unsaturated carboxylic acid), aromatic monocarboxylic acid (for example, benzoic acid, o-nitrobenzoic acid, p-nitrobenzoic acid, cinnamic acid, naphthoic acid), and oxycarboxylic acid (for example, salicylic acid, mandelic acid, resorcylic acid). Among these compounds, particularly preferred compounds are those having high conductivity and excellent thermal conductivity such as maleic acid, phthalic acid, cyclohexane carboxylic acid, cyclohexene-1,2-dicarboxylic acid, cyclohexane-1,2-dicarboxylic acid, adipic acid, and benzoic acid.

The ratio of organic acid and base for composing the electrolyte is usually 4 to 11 at the pH of the electrolyte, and preferably 6 to 9. Out of this range, the spark voltage of the electrolyte (dielectric strength) is lowered.

As the electrolytic salt, organic carboxylic acids stable electrically and chemically are desired. Preferred examples of such organic carboxylic acid include maleic acid, phthalic acid, cyclohexane carboxylic acid, cyclohexene-1,2-dicarboxylic acid, cyclohexene-1,2-dicarboxylic acid, adipic acid, and quaternary salt of compound having alkyl substituent amidine group of benzoic acid.

The electrolyte of the electrolytic capacitor of the invention may mix and contain various additives as required. Usable additives include phosphor compounds (phosphoric acid, ester phosphate, etc.), boric acid compounds (boric acid, complex of boric acid and polysaccharides (mannite, sorbit, etc.)), nitro compounds (o-nitrobenzoic acid, n-nitrobenzoic acid, p-nitrobenzoic acid, o-nitrophenol, m-nitrophenol, p-nitrophenol, p-nitroacetophenone, etc.), and others. In the aluminum electrolytic capacitor, mixing of these additives will improve the restoration of aluminum oxide film. As a result, it is preferred because an electrolytic capacitor of high dielectric strength can be formed easily.

As the bar element for the terminal of the electrolytic capacitor of the invention, a material undergoing corrosion preventive treatment may be used. By corrosion preventive treatment of the bar element, electrolytic current can be suppressed, and the sealing performance may be enhanced. Corrosion preventive treatment of the bar element is preferred to be done on both terminals of anode and cathode, but only either one may be treated. As means of corrosion preventive treatment, anode oxidation treatment in aqueous solution, coating-sintering of metal alkoxide, and coating-sintering of colloidal solution of metal oxide (colloidal solution of silicon dioxide and titanium dioxide) are convenient and preferred.

The sealing member 7 is preferably an elastic material mainly composed of rubber polymer formed of a copolymer of isobutylene, isoprene and divinyl benzene, comprising 0.5 to 20 parts of vulcanizing agent such as peroxide or alkyl phenol formalin resin. In other vulcanizing method using other vulcanizing agent than peroxide or alkyl phenol formalin resin (for example, sulfur vulcanization), the rubber elasticity drops significantly when left over for a long period in the condition of high temperature and high humidity, and sufficient sealing performance is not obtained, and as a result the organic conductive material may oxidize and deteriorate due to invasion of water from outside.

Preferred embodiments of the invention are described below. In the embodiments, a "part" always refers to a "part by weight."

The composition of the electrolytes used in the embodiments of the invention and in comparative examples is as follows. As the index of hydrogen ion concentration of the base of the electrolyte or the hydroxide of the base in an aqueous solution, the pH is expressed as a note. The pH is defined in the formula: pH=-log [hydrogen ion concentration]. Therefore, if the pH is 13 or less, it means that the hydrogen ion concentration is $1.0\times10^{-13}$ mol/dm$^3$ or more. Besides, an aluminum foil having a dielectric oxide film formed on the surface at voltage of 500 V was immersed in the electrolyte (temperature 30° C.). In this state, the spark ignition voltage of electrolyte (that is, the dielectric strength of electrolyte) observed by constant voltage-current elevation at constant current of 2.0 mA/cm$^2$ and the conductivity (measuring temperature 30° C.) are shown.

Electrolyte A

γ-butyrolactone (100 parts), mono-1,2,3,4-tetramethyl imidazolinium phthalate (30 parts) [note: pH=11.2], o-nitrobenzoic acid (1 part), monobutyl ester phosphate (1 part), boric acid (2 parts), and mannite (2 parts) were mixed and dissolved.

The spark voltage was 85 V, and the conductivity was 9.0 mS/cm.

Electrolyte B

γ-butyrolactone (50 parts), ethylene glycol (50 parts), trimethyl ammonium maleate (5 parts) [note: pH=9.5], trimethylamine phthalate (5 parts) [note: pH=9.5], diammonium adipate (3 parts) [note: pH=9.1], boric acid (0.5 part), p-nitrobenzoic acid (1 part), and phosphoric acid (0.5 part) were mixed and dissolved.

The spark voltage was 180 V, and the conductivity was 3.3 mS/cm.

Electrolyte C

Ethylene glycol (70 parts), glycerin (30 pats), diammonium adipate (15 parts) [note: pH=9.1], 1,6-decane dicarboxylic acid (1 part) [note: pH=9.1], 1,7-octane dicarboxylic acid (1 part) (note: pH=9.1], o-nitrophenol (1 part), and ammonium hypophosphite (1 part) [note: pH=9.1] were mixed and dissolved.

The spark voltage was 340 V, and the conductivity was 0.9 mS/cm.

Electrolyte D:

γ-butyrolactone (100 parts) and tetramethyl ammonium phthalate (40 parts) [note: pH=13.2] were mixed and dissolved.

The spark voltage was 79 V, and the conductivity was 11.5 mS/cm.

The sealing members of rubber used in the embodiments of the invention and comparative examples are as follows.

Sealing member A [vulcanization by peroxide]

It was vulcanized and formed by mixing 30 parts of rubber polymer composed of a copolymer of isobutylene, isoprene and divinyl benzene, 20 parts of carbon, 50 parts of inorganic filler, and 2 parts of dicuwyl peroxide as a vulcanizing agent. The hardness of the sealing member after forming was measured on the surface portion at the side contacting with the capacitor element between two rubber holes for penetrating a lead, and the surface of the portion contacting with the lead wire side of the rubber hole inside. As a result, the IRHD (international rubber hardness degree) was respectively 67 IRHD and 66 IRHD.

Sealing member B [vulcanization by resin]

It was vulcanized and formed by mixing 30 parts of rubber polymer composed of a copolymer of isobutylene and isoprene, 20 parts of carbon, 50 pats of inorganic filler, and 2 parts of alkyl phenol formalin resin as vulcanizing agent. The hardness of the sealing member after forming was measured on the surface portion at the side contacting with the capacitor element between two rubber holes for penetrating a lead, and the surface of the portion contacting with the lead wire side of the rubber hole inside. As a result, the IRHD (international rubber hardness degree) was respectively 77 IRHD and 76 IRHD.

Embodiment 1

An anode aluminum foil and a cathode aluminum foil were wound around an electrolytic paper containing Manila hemp fibers (density 0.55 g/cm$^3$, thickness 50 μm). Thus prepared winding type aluminum electrolytic capacitor was kept at temperature of 300° C. for 30 minutes, and the electrolytic paper was carbonized. Then, this capacitor element was immersed in a water-ethanol solution containing ethylene dioxythiophen and ferric sulfate, and lifted, and polymerized (10 minutes at 105° C.), and this process was repeated 10 times. The solid organic conductive material layer composed of polyethylene dioxythiophen thus polymerized chemically was formed on the electrode foils and between electrode foils. Consequently, the capacitor element was washed in water, and dried. Further, electrolyte A was impregnated in this capacitor element. As a result, an aluminum electrolytic capacitor element with rated voltage of 50 V and electrostatic capacity of 390 μF was obtained. This capacitor element was put in an aluminum metallic case together with sealing member A, and the opening was sealed by curling process. Thus, an aluminum electrolytic capacitor was composed (size: ϕ1.3 mm×L 20 mm).

Embodiment 2

A glass fiber nonwoven cloth (density (1.13 g/cm$^3$, thickness 50 μm), an anode aluminum foil, and a cathode aluminum foil were immersed in a water-ethanol solution containing pyrrole and ammonium persulfate, and lifted, dried and polymerized (10 minutes at 105° C.), and this process was repeated three times. Thus, a chemically polymerized polypyrrole was formed. Then, washing in water and drying, the separator made conductive by the chemically polymerized polypyrrole, and the anode aluminum foil and cathode aluminum foil having the chemically polymerized polypyrrole formed on the surface were obtained. Then, through this conductive separator, the anode aluminum foil and cathode aluminum foil having the chemically polymerized polypyrrole formed on the surface were wound, and a capacitor element was formed. It was further immersed in soluble sulfonated polyaniline solution at concentration of 10 wt. %, impregnated at reduced pressure, lifted, and dried, Thus, the residual dried sulfonated polyaniline was formed between the anode aluminum foil and cathode aluminum foil having chemically polymerized polypyrrole. Thus, the electric bonding between the electrode foils was reinforced. Still more, this capacitor element was impregnated in electrolyte A. As a result, an aluminum electrolytic capacitor element with rated voltage of 50 V and electrostatic capacity of 390 μF was obtained. This capacitor element was put in an aluminum metallic case together with sealing member A, and the opening was sealed by curling process. Thus, an aluminum electrolytic capacitor was composed (size: ϕ13 mm×L 20 mm).

Embodiment 3

On a glass fiber nonwoven cloth (density 0.13 g/cm$^3$, thickness 50 μm), an anode aluminum foil, and a cathode aluminum foil, 7,7,8,8-tetracyanoquinodimethane complex in molten state was applied individually. Then, by cooling, the separator made conductive by the 7,7,8,8-tetracyanoquinodimethane complex, and the anode aluminum foil and cathode aluminum foil having the 7,7,8,8tetracyanoquinodimethane complex formed on the surface were obtained. Then, through this conductive separator, the anode aluminum foil and cathode aluminum foil having the 7,7,8,8-tetracyanoquinodimethane complex formed on the surface were wound. Thus a capacitor element was formed. It was further immersed in soluble sulfonated polyaniline solution at concentration of 10 wt. %, impregnated at reduced pressure, lifted, and dried at a temperature below the melting point of the 7,7,8,8-tetracyanoquinodimethane complex. Thus, the residual dried sulfonated polyaniline was formed between the anode aluminum foil and cathode aluminum foil having the 7,7,8,8-tetracyanoquinodimethane complex. Thus, the electric bonding between the electrode foils was reinforced. Still more, this capacitor element was impregnated in electrolyte A. As a result, an aluminum electrolytic capacitor element with rated voltage of 50 V and electrostatic capacity of 390 μF was obtained. This capacitor element was put in an aluminum metallic case together with sealing member A, and the opening was sealed by curling process. Thus, an aluminum electrolytic capacitor was composed (size: ϕ13 mm×L 20 mm).

Embodiment 4

An electrolytic capacitor was prepared in the same manner as in embodiment 1 except that electrolyte B was used as the electrolyte in embodiment 1 of the invention.

Embodiment 5

An electrolytic capacitor was prepared in the same manner as in embodiment 1 except that electrolyte C was used as the electrolyte in embodiment 1 of the invention.

Embodiment 6

An electrolytic capacitor was prepared in the same manner as in embodiment 1 except that electrolyte D was used as the electrolyte in embodiment 1 of the invention.

Embodiment 7

An electrolytic capacitor was prepared in the same manner as in embodiment 1 except that sealing member B was used as the sealing member in embodiment 1 of the invention.

Embodiment 8

An electrolytic capacitor was prepared in the same manner as in embodiment 1 except that pyrrole was used instead of ethylene dioxythiophen in embodiment 1 of the invention.

Embodiment 9

An electrolytic capacitor was prepared in the same manner as in embodiment 1 except that aniline was used instead of ethylene dioxythiophen in embodiment 1 of the invention.

Embodiment 10

An electrolytic capacitor was prepared in the same manner as in embodiment 1 except that a mixture of iron p-toluene sulfonate and iron dodecyl benzene sulfonate was used instead of ferric sulfate, and that water-methanol solution was used instead of water-ethanol solution in embodiment 1 of the invention.

Embodiment 11

An electrolytic capacitor was prepared in the same manner as in embodiment 1 except that a mixture of ammonium persulfate and hydrogen persulfate water was used instead of ferric sulfate in embodiment 1 of the invention.

Comparative Example 1

An anode aluminum foil and a cathode aluminum foil were wound around an electrolytic paper containing Manila hemp fibers (density 0.55 g/cm$^3$, thickness 50 μm). Thus a capacitor element was prepared. This capacitor element was impregnated in electrolyte A, and an aluminum electrolytic capacitor element with rated voltage of 50 V and electrostatic capacity of 390 μF was obtained. This capacitor element was put in an aluminum metallic case together with sealing member A. Then the opening was sealed by curling process. Thus, an aluminum electrolytic capacitor was composed (size: ϕ3 mm×L 20 mm).

Comparative Example 2

An electrolytic capacitor was prepared in the same manner as in embodiment 1 except that electrolyte A was not impregnated in embodiment 1 of the invention.

Comparative Example 3

An anode aluminum foil and a cathode aluminum foil were wound around an electrolytic paper containing Manila hemp fibers (density 0.55 g/cm$^3$, thickness 50 μm). Thus a capacitor element was prepared. This capacitor element was kept at temperature of 300° C. for 30 minutes, and the electrolytic paper was carbonized. Then this element was immersed in 7,7,8,8-tetracyanoquinodimethane complex in molten state and impregnated at reduced pressure. By cooling, a 7,7,8,8-tetracyanoquinodimethane complex layer was formed directly between the electrodes. Thus, an aluminum electrolytic capacitor element with rated voltage of 50 V and electrostatic capacity of 390 μF was obtained. This capacitor element was put in an aluminum metallic case together with sealing member A, and the opening was sealed by curling process. Thus, an aluminum electrolytic capacitor was composed (size: ϕ13 mm×L 20 mm).

Comparative Example 4

An anode aluminum foil and a cathode aluminum foil were wound around a glass fiber nonwoven cloth (density 0.13 g/cm$^3$, thickness 50 μm), and the obtained aluminum electrolytic capacitor element was immersed in an aqueous solution of manganese nitrate, lifted, and pyrolyzed (10 minutes at 300° C.), and this process was repeated 10 times, and a manganese dioxide layer which is a solid inorganic conductive material was directly formed between the electrodes. This capacitor element was impregnated in electrolyte A. Thus, an aluminum electrolytic capacitor element with rated voltage of 50 V and electrostatic capacity of 390 μF was obtained. This capacitor element was put in an aluminum metallic case together with sealing member A, and the opening was sealed by curling process. Thus, an aluminum electrolytic capacitor was composed (size: ϕ13 mm×L 20 mm).

Comparative Example 5

An electrolytic capacitor was prepared in the same manner as in comparative example 1 except that carbon fabric weaving carbon fibers was used instead of the electrolytic paper in comparative example 1.

Comparative Example 6

An electrolytic capacitor was prepared in the same manner as in comparative example 1 except that glass fiber nonwoven cloth coated with water dispersion type colloidal graphite was used instead of the electrolytic paper in compartitive example 1.

Table 1 shows results of comparison of initial characteristics (electrostatic capacity, impedance leak current) and number of shorting troubles during aging process in aluminum electrolytic capacitors in embodiments 1 to 11 of the invention and comparative examples 1 to 6.

In each material, the number of samples was 20, and the initial characteristic (except for shorting troubles) is expressed by the average of 20 samples.

TABLE 1

| | Electrostatic capacity (μF) f = 120 Hz | Leak current (μA) at rated voltage, 2 min | Number of shorting troubles during aging | Impedance (mΩ) f = 400 kHz |
|---|---|---|---|---|
| Embodiment 1 | 390 | 92 | 0 | 10 |
| Embodiment 2 | 390 | 90 | 0 | 11 |
| Embodiment 3 | 370 | 93 | 0 | 11 |
| Embodiment 4 | 393 | 90 | 0 | 12 |
| Embodiment 5 | 385 | 88 | 0 | 22 |
| Embodiment 6 | 380 | 180 | 0 | 10 |
| Embodiment 7 | 390 | 89 | 0 | 11 |
| Embodiment 8 | 390 | 89 | 0 | 12 |
| Embodiment 9 | 384 | 90 | 0 | 13 |
| Embodiment 10 | 360 | 91 | 0 | 13 |
| Embodiment 11 | 380 | 91 | 0 | 11 |
| Comparative example 1 | 395 | 70 | 0 | 41 |
| Comparative example 2 | 360 | 1000 or more | 15 | 15 |
| Comparative example 3 | 385 | 1000 or more | 18 | 13 |
| Comparative example 4 | 385 | 195 | 2 | 18 |
| Comparative example 5 | 380 | 170 | 0 | 30 |
| Comparative example 6 | 390 | 1000 or more | 17 | 25 |

As clear from Table 1, the electrolytic capacitors in embodiments 1 to 11 of the invention is extremely small in impedance as compared with the electrolytic capacitor composed only of electrolyte in comparative example 1.

In the aluminum electrolytic capacitor lowered in resistance by using carbon fabric weaving carbon fibers as means of making the separator conductive in comparative example 5, the impedance is improved as compared with comparative example 1, but the impedance is larger than in the electrolytic capacitors in embodiments 1 to 11.

In the electrolytic capacitors in the comparative examples, that is, in the aluminum electrolytic capacitor not having electrolyte using only conductive high polymer (polyethylene dioxythiophen layer) in comparative example 2, in the aluminum electrolytic capacitor not having electrolyte using only organic semiconductor (7,7,8,8-tetracyanoquinodimethane complex layer) in comparative example 3, and in the aluminum electrolytic capacitor lowered in resistance by applying water-dispersion type colloidal graphite as the conductive means of separator in comparative example 6, shorting troubles (shorting between electrodes due to lack of dielectric strength) occurred in all samples during aging process for applying a direct voltage of 63 V at temperature of 85° C.

In the aluminum electrolytic capacitor using manganese dioxide which is a solid inorganic conductive material, instead of solid organic conductive material, in comparative example 4, although the impedance is excellent, since the conductive material is inorganic, the electrolyte, which is an organic matter, is hardly diffused, and the restoration performance of the dielectric oxide film was not assured sufficiently. Accordingly, slight shorting troubles occurred during aging.

As explained herein, the invention presents, in a simple process, electrolytic capacitors having excellent characteristics, such as excellent impedance characteristic, small leak current, superior reliability, and high dielectric strength. Of the embodiments of the invention, in embodiment 6 of the invention using electrolyte D, since the spark ignition voltage of electrolyte is below 80 V, the dielectric strength is not sufficient, and the leak current value tends to be higher as compared with other embodiments although shorting did not occur during aging. Therefore, to express the effects of the invention sufficiently in the aspects of dielectric strength and leak current, the spark ignition voltage of the electrolyte is preferred to be 80 V or more.

Of the embodiments of the invention, in embodiment 5 of the invention using electrolyte C, since the conductivity of the electrolyte is less than 1.0 mS/cm, the conductivity is not sufficient, and the impedance tends to be higher as compared with other embodiments. In order to express the effects of the invention sufficiently in the aspect of impedance performance, the conductivity of the electrolyte is preferred to be 1.0 mS/cm or more.

Table 2 shows the results of observation of the sealing member surface after 1000 hours of continuous application test of rated voltage of 50 V in the atmosphere of temperature of 60° C. and relative humidity of 95%, in aluminum electrolytic capacitors in embodiments 1 to 11 of the invention. The number of samples is 20 each.

TABLE 2

| | Appearance of sealing member surface after 1000 hours of humidity resistance test at 60° C., 95% RH |
|---|---|
| Embodiment 1 | No abnormality |
| Embodiment 2 | No abnormality |
| Embodiment 3 | No abnormality |

TABLE 2-continued

| | Appearance of sealing member surface after 1000 hours of humidity resistance test at 60° C., 95% RH |
|---|---|
| Embodiment 4 | No abnormality |
| Embodiment 5 | No abnormality |
| Embodiment 6 | Electrolyte leak in 2 samples |
| Embodiment 7 | No abnormality |
| Embodiment 8 | No abnormality |
| Embodiment 9 | No abnormality |
| Embodiment 10 | No abnormality |
| Embodi meat 11 | No abnormality |

As clear from Table 2, extreme abnormality was not observed in any embodiment. However, in embodiment 6 using electrolyte D, since the base of the electrolytic material is a base of strong basicity with hydrogen ion concentration of less than $1.0\times10^{-13}$ mol/dm$^3$, in the long-term test in complex environments of high temperature and high humidity, the sealing member (sealing portion) is likely to be damaged by the effects of the base of strong basicity, and, as a result, electrolyte leak was observed in two samples. The electrolyte leaks from the lead. In order to express the effects of the invention sufficiently in the aspect of reliability, in the base for composing the electrolytic substance, the concentration of the base or the hydroxide of the base is preferred to be 1 wt. % or more, and when the measuring temperature is 30° C., the hydrogen ion concentration of the base or the hydroxide of the base in aqueous solution is preferred to be selected at $1.0\times10^{-13}$ mol/dm$^3$ or more.

According to the method of embodiments 1 to 11 of the invention and comparative examples 2 and 3, again, aluminum electrolytic capacitor elements with rated voltage of 6.3 V and electrostatic capacity of 1000 μF were obtained. This capacitor element was put in a aluminum metallic case together with the sealing member A. Then the opening was sealed by curling process. Consequently, a resin seat plate made of polyphenylene sulfide was mounted. As a result, an aluminum electrolytic capacitor of vertical surface mounting type was fabricated (size: ϕ10 mm×L 10 mm). Thus composed aluminum electrolytic capacitor of surface mounting type was mounted on a glass epoxy substrate (2 mm thick) by using cream solder (Sn—Ph eutectic composition). By passing through a reflow furnace for infrared and hot air treatment (peak temperature 240° C., exposure time to temperature of 200° C. or more of 50 seconds), mounting and heat resistance test was conducted. The number of samples was 20.

As a result, the surface mounting type aluminum electrolytic capacitors composed in the methods conforming to embodiments 1 to 11 of the invention were suppressed in pressure elevation in the capacitor due to water adsorbed on the members because the electrolyte was composed of an organic solvent with boiling point of 200° C. or more added to solid organic conductive material as electrolytic substance. Hence, mounting troubles due to scatter of sealing member of swelling of sealing member did not occur. On the other hand, in the surface mounting type aluminum electrolytic capacitors composed in the methods conforming to comparative examples 2 and 3, the pressure elevation in the capacitor due to adsorbed water was extreme, and the sealing members scattered in all 20 samples. Evidently, the surface mounting type aluminum electrolytic capacitors manufactured in the methods of the embodiments of the invention were enhanced in heat resistance when mounting, by using the electrolyte composed of organic solvent of boiling point of 200° C. or more, in addition to the solid organic conductive material.

Thus, the electrolytic capacitors of the invention have excellent characteristics such as excellent impedance characteristic, small leak current, excellent reliability, and high dielectric strength. Hence, its industrial values are outstanding.

What is claimed is:

1. An electrolytic capacitor comprising:

(a) a capacitor element having a positive electrode, a negative electrode, and a solid organic conductive material, said capacitor element arranged such that said positive electrode and negative electrode define a region therebetween, (b) an electrolyte, (c) a case for accommodating said capacitor element and said electrolyte, and (d) a sealing member disposed to over an opening of said case, wherein said solid organic conductive material is disposed so that said solid organic conductive material fills said region between said positive electrode and said negative electrode such that said solid organic conductive material functions as a solid electrolyte.

[2. An electrolytic capacitor of claim 1, wherein said positive electrode comprises a metal foil and a dielectric oxide film formed on the surface of said metal foil, and has a valve action.]

[3. An electrolytic capacitor of claim 1, wherein said case is formed of a tubular metal having a bottom.]

4. [An] *The* electrolytic capacitor of claim 1, wherein said solid organic conductive material has a conductive polymer.

5. [An] *The* electrolytic capacitor of claim 4, wherein said conductive polymer has a polymer of at least one monomer selected from the group consisting of pyrrole, aniline, thiophen, ethylene dioxythiophen, sulfonated aniline, sulfonated pyrrole, sulfonated thiophen, sulfonated ethylene dioxythiophen, and their derivatives.

6. [An] *The* electrolytic capacitor of claim 4, wherein said conductive polymer has at least one polymer selected from the group consisting of liquid-phase chemical polymerization composition, vapor-phase polymerization composition, liquid-phase electrolytic polymerization composition, and residual dry polymer of soluble polymer solution.

7. [An] *The* electrolytic capacitor of claim 5, wherein said conductive polymer has at least one polymer formed by chemically polymerizing selected from the group consisting of polypyrrole, polyethylene dioxythiophen, and polyaniline.

8. [An] *The* electrolytic capacitor of claim 5, wherein said conductive polymer has at least one polymer formed by electrolytically polymerizing selected from the group consisting of polypyrrole, polyethylene dioxythiophen, and polyaniline.

9. [An] *The* electrolytic capacitor of claim 1, wherein said solid organic conductive material is at least one selected from the group consisting of organic semiconductor and conductive polymer, and a residual dry polymer of soluble sulfonated polyaniline solution.

10. [An] *The* electrolytic capacitor of claim 1, wherein said electrolyte has an organic solvent, and at least one electrolytic substance of organic salt and inorganic salt dissolved in said organic solvent.

11. [An] *The* electrolytic capacitor of claim 10, wherein said solid organic conductive material is swollen in said organic solvent.

12. [An] *The* electrolytic capacitor of claim 10, wherein said electrolyte has at least one selected from the group consisting of a compound having alkyl subsistent amidine group, quaternary salt of compound having alkyl substituent amidine group, tertiary amine, and ammonium.

13. [An] *The* electrolytic capacitor of claim 12, wherein said electrolyte has said quaternary salt of compound having alkyl substituent amidine group, the alkyl substituent of said quaternary salt of compound having alkyl substituent amidine group is one selected from the group consisting of alkyl group and aryl alkyl group with 1 to 11 carbon atoms, and the compound having the amidine group of said quaternary salt of the compound having alkyl substituent amidine group is at least one selected from the group consisting of imidazole compound, benzoimidazole compound, and alicyclic amidine compound.

14. [An] *The* electrolytic capacitor of claim 10, wherein said electrolyte has at least one property selected from the group consisting of:

(1) *a* boiling point is 200° C. or more, (2) *an* electric conductivity at measuring temperature of 30° C. is 1.0 mS/cm or more, and (3) *a* spark ignition voltage is 80 V or more.

15. The electrolytic capacitor of claim 1, wherein said solid organic conductive material is disposed on at least one of said positive electrode and said negative electrode.

16. The electrolytic capacitor of claim 1, wherein said solid organic conductive material is disposed at least one of in and on said separator, and further, said solid organic conductive material is disposed on at least one of said positive electrode and said negative electrode.

17. The electrolytic capacitor of claim 1, wherein said electrolyte includes a solvent and an electrolytic substance, and said electrolytic substance is dissolved in said solvent.

[18. An electrolytic capacitor comprising:

(a) a capacitor element having a positive electrode, a negative electrode, and a solid organic conductive material, said capacitor element arranged such that said positive electrode and negative electrode define a region therebetween, (b) an electrolyte, (c) a case for accommodating said capacitor element and said electrolyte, and (d) a sealing member disposed to cover an opening of said case, wherein said solid organic conductive material is disposed so that said solid organic conductive material fills said region between said positive electrode and said negative electrode such that said solid organic conductive material functions as a solid electrolyte, wherein said solid organic conductive material has an organic semiconductor material.]

[19. An electrolytic capacitor of claim 18, wherein said organic semiconductor material is at least one selected from the group consisting of 7,7,8,8-tetracyanoquinodimethane complex and its derivatives.]

20. An electrolytic capacitor comprising:

(a) a capacitor element having a positive electrode, a negative electrode, and a solid organic conductive material disposed between said positive electrode and said negative electrode, (b) an electrolyte, (c) a case for accommodating said capacitor element and said electrolyte, and (d) a sealing member disposed to cover an opening of said case, wherein said solid organic conductive material has an organic semiconductor material and a conductive polymer.

21. An electrolytic capacitor comprising:

(a) a capacitor element having a positive electrode, a negative electrode, and a solid organic conductive material, said capacitor element arranged such that said positive electrode and negative electrode define a region therebetween, (b) an electrolyte, (c) a case for accommodating said capacitor element and said electrolyte, and (d) a sealing member disposed to cover an opening of said case, wherein said solid organic conductive material is disposed so that said solid organic conductive material fills said region between said positive electrode and said negative electrode such that said solid organic conductive material functions as a solid electrolyte, wherein said solid organic conductive material has a conductive polymer, wherein said conductive polymer has a residual dry polymer of soluble sulfonated polyaniline solution.

22. An electrolytic capacitor comprising:

(a) a capacitor element having a positive electrode, a negative electrode, and a solid organic conductive material disposed between said positive electrode and said negative electrode, (b) an electrolyte, (c) a case for accommodating said capacitor element and said electrolyte, and (d) a sealing member disposed to cover an opening of said case, wherein said electrolyte has an organic solvent, and at least one electrolytic substance of organic salt and inorganic salt dissolved in said organic solvent, *and* wherein a base of said at least one electrolytic substance has a hydrogen ion concentration of $1.0\times10^{-13}$ mol/$dm^3$ or more in 1 wt. % aqueous solution of the base or hydroxide of the base.

23. An electrolytic capacitor comprising:

(a) a capacitor element having a positive electrode, a negative electrode, and a solid organic conductive material disposed between said positive electrode and said negative electrode, (b) an electrolyte, (c) a case for accommodating said capacitor element and said electrolyte, and (d) a sealing member disposed to cover an opening of said case wherein said electrolyte has an organic solvent, and at least one electrolytic substance of organic salt and inorganic salt dissolved in said organic solvent, *and* wherein said electrolyte has at least a quaternary salt of the compound having alkyl substituent amidine group selected from the group consisting of:

1-methyl-1, 8-diazabicyclo [5,4,0] undecenc-7,
1-methyl-1, 5-diazabicyclo [4,3,0] nonene-5,
1,2,3-trimethyl imidazolinium,
1,2,3,4-tetramethyl imidazolinium,
1,2-dimethyl-3-ethyl-imidazolinium,
1,3,4-trimethyl-2-ethyl imidazolinium,
1,3-dimethyl-2-heptyl imidazolinium,
1,3-dimethyl-2-(-3' heptyl) imidazolinium,
1,3-dimethyl-2-dodecyl imidazolinium,
1,2,3-trimethyl-1,4,5,6-tetrahydropyrimidium,
1,3-dimethyl imidazolium,
1-methyl-3-ethyl-imidazolium, and
1,3-dimethyl benzoimidazolium.

24. An electrolytic capacitor comprising:

(a) a capacitor element having a positive electrode, a negative electrode, and a solid organic conductive material, said capacitor element arranged such that said positive electrode and negative electrode define a region therebetween, (b) an electrolyte, (c) a case for accommodating said capacitor element and said electrolyte, and (d) a sealing member disposed to cover an opening of said case, wherein said solid organic conductive material is disposed so that said solid organic conductive material fills said region between said positive electrode and said negative electrode such that said solid organic conductive material functions as a solid electrolyte, said electrolytic capacitor further comprising a separator between said positive electrode and said negative electrodes, *and* wherein said solid organic conductive material is disposed on surfaces of said positive electrode and said negative electrode, and in said separator, said electrolyte includes a solvent and electrolytic substance, and said electrolyte is disposed in said solid organic conductive material and said separator at a state of swelling said solid organic conductive material and said separator.

[25. An electrolytic capacitor comprising:

(a) a capacitor clement having a positive electrode, a negative electrode, and a solid organic conductive material disposed between said positive electrode and said negative electrode, (b) an electrolyte, and (c) a case for accommodating said capacitor element and said electrolyte, wherein said solid organic conductive material is formed on at least one of said positive electrode and said negative electrode, wherein at least one of said positive electrode and said negative electrode has a dielectric oxide film formed on a surface thereof, wherein said dielectric oxide film has a roughening surface, and said solid organic conductive material is disposed in a hollow place of said roughening surface of said dielectric oxide film.]

26. An electrolytic capacitor comprising:

(a) a capacitor element having a positive electrode, a negative electrode, and a solid organic conductive material disposed between said positive electrode and said negative electrode, (b) an electrolyte, and (c) a case for accommodating said capacitor element and said electrolyte, wherein said solid organic conductive material is formed on at least one of said positive electrode and said negative electrode, *and*

*said solid organic conductive material has at least one polymer selected from the group consisting of polythiophen, polyethylene dioxythiophen, and their derivatives.*

27. The electrolytic capacitor of claim 26, further comprising a separator disposed between said positive electrode and said negative electrode.

[28. The electrolytic capacitor of claim 26, wherein said electrolyte is disposed between said positive electrode and said negative electrode.]

[29. The electrolytic capacitor of claim 26, wherein said solid organic conductive material has at least one of an organic semiconductor material and a conductive polymer.]

[30. The electrolytic capacitor of claim 26, further comprising a sealing member disposed at an opening of said case.]

[31. The electrolytic capacitor of claim 26, wherein at least one of said positive electrode and said negative electrode has a dielectric oxide film formed on a surface thereof.]

[32. The electrolytic capacitor of claim 26, wherein said solid organic conductive material has a function of a solid electrolyte.]

33. The electrolytic capacitor of claim 26, wherein said electrolyte includes a solvent and electrolytic substance, and said electrolytic substance is dissolved in said solvent.

34. The electrolytic capacitor of claim 26, wherein said solid organic conductive material is [disposed so that said solid organic conductive material fills between said positive electrode and said negative electrode] *formed by impregnating between said positive electrode and said negative electrode with a liquid composition that includes said solid organic conductive material and a solvent, and by drying said liquid composition thereafter.*

35. The electrolytic capacitor of claim 26, further comprising a separator between said positive electrode and said negative electrode, wherein said solid organic conductive material is disposed further in said separator, said electrolyte includes a solvent and electrolytic substance, and said electrolyte is disposed in said solid organic conductive material and said separator at a state of swelling said solid organic conductive material and said separator.

36. An electrolytic capacitor comprising:

(a) a capacitor element having a positive electrode, a negative electrode, and a solid organic conductive material disposed between said positive electrode and said negative electrode, (b) a separator disposed between said positive electrode and said negative electrode, (c) an electrolyte, and (d) a case for accommodating said capacitor element and said electrolyte, wherein said solid organic conductive material is disposed at least one of in and on said separator, [and]

further said solid organic conductive material is disposed on at least one of said positive electrode and said negative electrode, *and*

*said electrolyte swells said solid organic conductive material.*

37. The electrolytic capacitor of claim 36, wherein said electrolyte [is disposed between said positive electrode and said negative electrode] *has at least one of γ-butyrolactone and ethylene glycol.*

38. The electrolytic capacitor of claim 36, wherein said solid organic conductive material has at least one [of an organic semiconductor material and a conductive polymer] *polymer selected from the group consisting of polythiophen, polyethylene dioxythiophen, and their derivatives.*

[39. The electrolytic capacitor of claim 36, further comprising a sealing member disposed at an opening of said case.]

[40. The electrolytic capacitor of claim 36, wherein at least one of said positive electrode and said negative electrode has a dielectric oxide film formed on a surface thereof.]

[41. The electrolytic capacitor of claim 40, wherein said dielectric oxide film has a roughening surface, and said solid organic conductive material is disposed in a hollow place of said roughening surface of said dielectric oxide film.]

[42. The electrolytic capacitor of claim 36, wherein said solid organic conductive material has a function of a solid electrolyte.]

[43. The electrolytic capacitor of claim 36, wherein said electrolyte includes a solvent and electrolytic substance, and said electrolytic substance is dissolved in said solvent.]

44. The electrolytic capacitor of claim 36, wherein said solid organic conductive material is [disposed so that said solid organic conductive material fills between said positive electrode and said negative electrode] *formed by impregnating between said positive electrode and said negative electrode with a liquid composition that includes said solid organic conductive material and a solvent, and by drying said liquid composition thereafter.*

45. The electrolytic capacitor of claim 36, wherein said solid organic conductive material is disposed in said separator, said electrolyte includes a solvent and electrolytic substance, and said electrolyte is disposed in said solid organic conductive material and said separator at a state of swelling said solid organic conductive material and said separator.

*46. The electrolytic capacitor of claim 5, wherein said conductive polymer has at least one polymer selected from the group consisting of polythiophen, polyethylene dioxythiophen, and their derivatives.*

*47. The electrolytic capacitor of claim 10, wherein said organic solvent has at least one of γ-butyrolactone and ethylene glycol.*

*48. The electrolytic capacitor of claim 10, wherein said electrolyte has at least one selected from the group consisting of polyhydric alcohol system solvents, lactone system solvents, water, amide system solvents, ether system solvents, nitrile system solvents, furane system solvents, and 2-imidazolidinone system solvents.*

*49. The electrolytic capacitor of claim 10, wherein said electrolyte has at least one selected from the group consisting of phosphor compounds, boric acid compounds, and nitro compounds.*

*50. The electrolytic capacitor of claim 33, wherein said organic solvent has at least one of γ-butyrolactone and ethylene glycol.*

*51. The electrolytic capacitor of claim 33, wherein said electrolyte has at least one selected from the group consisting of polyhydric alcohol system solvents, lactone system solvents, water, amide system solvents, ether system solvents, nitrile system solvents, furane system solvents, and 2-imidazolidinone system solvents.*

*52. The electrolytic capacitor of claim 33, wherein said electrolyte has at least one selected from the group consisting of phosphor compounds, boric acid compounds, and nitro compounds.*

*53. The electrolytic capacitor of claim 36, wherein said electrolyte has at least one selected from the group consisting of polyhydric alcohol system solvents, lactone system solvents, water, amide system solvents, ether system solvents, nitrile system solvents, furane system solvents, and 2-imidazolidinone system solvents.*

*54. The electrolytic capacitor of claim 36, wherein said electrolyte has at least one selected from the group consisting of phosphor compounds, boric acid compounds, and nitro compounds.*

* * * * *